Nov. 18, 1952  C. O. SHINDLER  2,618,094
ARTIFICIAL BAIT
Filed March 9, 1949

Charles Orville Shindler
INVENTOR.
BY Percy Tate Griffith
ATTORNEY

Patented Nov. 18, 1952

2,618,094

UNITED STATES PATENT OFFICE 2,618,094

ARTIFICIAL BAIT

Charles Orvil Shindler, Sarasota, Fla.

Application March 9, 1949, Serial No. 80,463

2 Claims. (Cl. 43—42.24)

This invention relates to fishing lures of the class of artificial bait for game fish, which simulate a minnow, being drawn through the water by casting or trolling or skittering and which usually embody a head with imitation eyes, to which the fishing line is attached, and a body and tail composed of feathers, nylon, brush or the like which aid in the simulation of a swimming bait and conceal in major part the hook.

There have been many inventions produced in this type of bait, each or most of which has served some useful object of its inventor, either in a supposed increased attractiveness of the bait to the fish, or in improvement in the efficiency and strength or durability of the product.

In the present invention, my object is to provide an artificial bait of this class which may be more easily and effectively constructed, which will withstand all the usual strains and stresses of use, including those of casting, trolling or otherwise dragging through the surface and depths of the water, contacts with obstacles, strange and hidden or unexpected, with weeds, branches, banks, pebbled bottoms or shells, coral, rocks, driftwood etc.; which can be adjusted, assembled, reset, repaired readily and quickly; which will be streamlined, snappy in appearance, better to simulate the sought effect of a minnow swimming, endure longer and preserve its shape and qualities better, and in general serve the needs and desires and requirements of expert fishermen and the trade.

The invention consists in the novel construction, combination of new, old, and modified parts and features, hereinafter described and shown and set forth in the appended claims.

In the accompanying drawings forming part of this specification, in which like numerals of reference designate corresponding parts in the several views.

Figure 4:
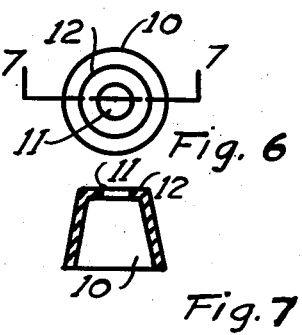
Figure 4 is a front elevation of the main body of the device before the brush is attached thereto, reduced to more like its actual size.

In manufacturing this invention, I first cast or otherwise form, a body 1 of metal or other desired material, somewhat streamlined to represent a small fish swimming swiftly in the water, when other appurtenant factors are added thereto. At an adequate distance down the shank of the body 1 there is formed an annular groove 2, forming annular shoulders 3 and 4 respectively above and below said groove. This groove 2 and adjacent shoulders 3 and 4 form an essential element of my invention, either as shown in Fig. 4 or by the modified form of Fig. 5. At the base of the body 1 is cast in or otherwise secured in said base or lower end a preferably fixed hook 6, its barbed portion projecting laterally. Near the top of the body is an eyelet 7.

Figure 1:
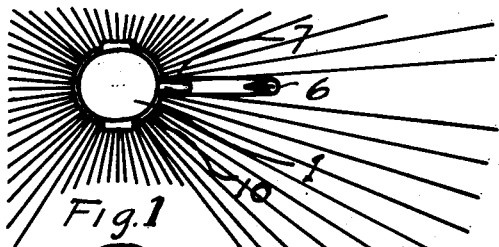
Figure 1 is a top plan view of a bait constructed according to my invention partly cut off, greatly enlarged to show it more clearly.
Figure 2:
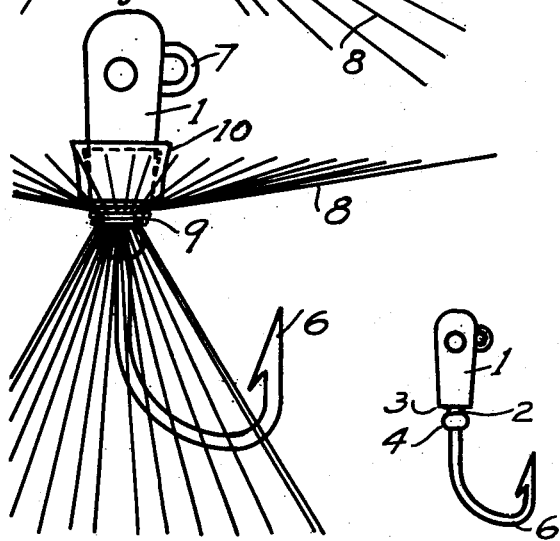
Figure 2 is a side elevation upon the same scale, with part of the brush cut off, showing the bait opened out.

Referring more particularly to Figures 1 to 4, I then proceed to affix the brush or lure 8 to the body 1. I make this preferably in that form of my invention, though not necessarily, out of fibres or threads of nylon, silk or similar soft, stringy material which is doubled or folded over in the middle of the strands of said material, which is usually stiff enough for the doubled strands to stretch away from each other as indicated in Figures 1 and 2, in which it will be seen that half of the mass of the nylon lure there shown lies down against the body 1, and the other half, or upper strands of the threads, project out unrestrainedly horizontally or at random from the body 1. I then tie and bind the lure to the body 1 by a binding cord 9. The fold or bight of the doubled threads lies in the annular groove 2, between the shoulders 3 and 4, and the binding cord 9, which is of any usual variety commonly used for binding such parts of baits and tackle, is wound around enough times or turns to project up or out from said groove; though contrarily the groove may be deep and the cord slight and tight, leaving the upper shoulder 3 to serve a like purpose which will hereinafter appear.

Figures 7, 8, 9:
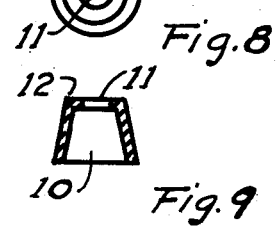
Figure 7 is a section of said sleeve taken on the line 7—7 of Figure 6.
Figure 8 is a bottom plan view of the adjustable clamping sleeve taken from the device shown in Figure 4.
Figure 9 is a section thereof on the line 9—9 of Figure 8.

Upon the shank of the body 1, above the said shoulder 3, and placed in position upon said shank before the brush or lure is applied, I mount the adjustable clamping sleeve 10 of pliable or stretchable plastic or similarly adaptable material. It is annular, frusto-conical, with downwardly flaring sides, and formed with a central orifice 11 in the top, less than the diameter of said top, thus leaving an annular flange 12 at its outer perimeter. This is shown rather clearly in Figures 7 and 9. On account of the small size of the object these figures accentuate the small size of the orifice and the projection of the annular flange, slightly beyond scale proportion. The pliability or stretchability of the plastic enables the sleeve to be slid upwardly upon the body 1 as illustrated in Fig. 2, while the brush or lure is being secured by the binding cord, and to be slid down the shank until the flange 12 seats itself under the shoulder 3 of the body, in the groove 2, where the said groove is deep and the binding cord tight in it; or until said flange passes the said binding cord if lumped outwardly, and catches beneath said cord; or it may be that in some cases the said flange will frictionally engage the lump or bulge of said cord as it projects out under the inside of the brush or lure, which it pushes outwardly from beneath.

Figure 3:
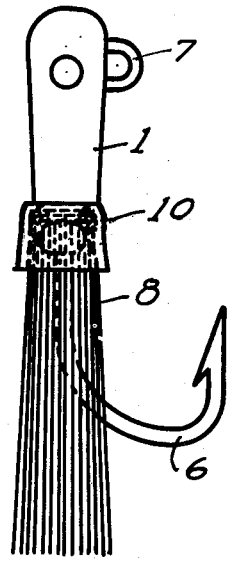
Figure 3 is a like side elevation of the bait completely assembled and with the adjustable clamping sleeve closed down, placing the bait in finished operative position ready for use.

As the adjustable clamping sleeve is pushed down from the upper portion of the shank of the body 1, into clamping position, it pushes down the outwardly projecting half of the fibres or strands of the brush or lure so that they are folded over upon the under half of said fibres or strands which already lie closely upon the bait as before described, and as illustrated in Figure 3. In this position the sleeve 10, whether caught beneath the shoulder 3 or otherwise frictionally engaged by the binding cord, will be clamped down upon said bait and the brush or lure thereof particularly, so that the latter will be retained in its position neatly and firmly, and with the strands of the lure positioned at a desired angle, as shown, with respect to the main axis of the hook shank.

The pliability and stretchability of the plastic sleeve, its measure of elasticity, enable its being slid upwardly upon the shank of the body 1 for access to the brush or lure, to enable its application and attachment in the first instance, and to repair the same, or replace it. The device can be made so as to push the sleeve down only so far as will reduce the expanded condition of the attached brush or lure to cover and not expose the hook, and not flatten it down completely to the position shown in Figure 3; or optionally reduce it whatever degree is desired, the adjustability of the sleeve to govern this being obvious from the drawings.

The bait is attached to the fishing-line by tying the same to said line through the medium of the eyelet 7 either directly or through the intervention of a gut-strip commonly known and used by expert anglers. The mode of operation of the lure is also well known, the only major difference being its increased efficiency in simulation of a streamlined swimming minnow, its facility of attachment and access for repair, adjustment, replacement of brush, and the smooth covering of the lure-top and binding so that the bait slicks through the water without creating current or splash.

Figure 5:
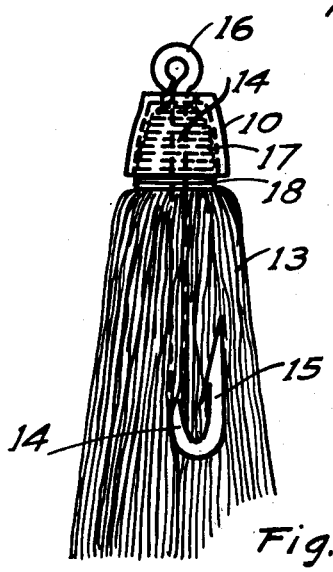
Figure 5 is a side elevation of a modified form of the invention, using what is known as a bucktail lure.
Figure 6:
Figure 6 is a plan view of the adjustable clamping sleeve forming part of the bait shown in Figure 5, removed therefrom.

In the application of my invention to the "bucktail" form of lure shown in Figure 5, the pliable clamping sleeve is proportionately larger to cover the customary bucktail 13, and also forms the head of the lure and, with part of the bucktail, forms the upper portion of the body thereof. The frusto-conical shape of the sleeve 10, in this form as well as in the first form of the device, deflects the water very slightly. The lower end of the sleeve embraces frictionally the upper portion of the bucktail but the orifice 11 in the top of the sleeve has the same flange 12 surrounding it, and this orifice, as with the orifice of the first form, is made of a size to fit over and upon a portion of the body and engage the same to lock the sleeve in position.

In the present case, the bucktail bait is made by first forming a shank 14 with a barbed hook 15 at the lower end, and an eyelet 16 at the upper end, all formed integrally. On this shank, beneath the eyelet 16, is placed the bucktail 13, the upper portion 17 of which is secured around the shank 14 and attached by a binding cord 18 wound around it and tied, thus making a sort of bulge. The diameter of the orifice 11 is so arranged with respect to the diameter of the eyelet 16, that the sleeve 10 can be stretched over and past said eyelet, letting the flange 12 snap down under said eyelet and locking the clamping sleeve in position where it covers the upper portion of the bucktail and the binding cord, with the flared lower end of said sleeve frictionally engaging said bucktail and bunched cord. The remainder of the bucktail drops down over the flange 14 and the hook 15.

It will be observed that, in both forms of my invention, the clamping sleeve elastically stretches over a shoulder or eyelet, as the case may be, and snaps down under it to lock the sleeve on the shank of the lure, and that, in both instances, the sleeve forms part of the body, thereby protecting and clamping down the brush or bucktail upon the upper portion of the body. The eyelet of the bucktail is used to attach the fishing line to the bait to draw it through the water when casting, trolling or skittering.

What I claim as new is:

1. An artificial bait comprising a metallic solid body portion formed to simulate the head of a swimming fish bait and having a line attaching means at one end thereof and a hook shank and a fish hook at the other end thereof, said body portion being formed with a width greater than that of the shank, the lower end of the body portion being provided with a recessed groove, that end of the body portion adjacent the hook being bulbous in form, a binding cord, a multistrand hackle secured to said body portion by means of said cord positioned to engage and force the central portion of the strands into said groove with the upper half of the strand ends flared outwardly, a sleeve for forcibly bending the upper strand ends downwardly to retain all strand ends adjacent to the shank, said sleeve being formed from a pliable, plastic material and with an appreciable flare outwardly towards its lower end, an inwardly extending flange formed on the upper end of the sleeve, said flange, with the sleeve in its operating position, being positioned within said groove above the binding cord, in which position the flared sleeve end will engage over the upper bent ends of the strands to bind the same and to retain the outermost strands in a flared relation adjacent to the hook, said sleeve being adapted to be moved towards the head end of the body portion to overlie the body portion and to expose the central bent portion of the hackle and the binding cord to permit repairs to be made on the hackle or on the cord and said flange on the sleeve serving to provide a water tight seal above said bent portion.

2. A fish lure comprising a body tapered in form and having an eye at its larger end and a groove circumferentially formed coaxially with the axis of the smaller end of the body, a bulbous formation forming the wall structure for one side of the groove, a fishing hook having a shank thereof extending through the bulbous portion and being secured thereto, a hackle positioned within the groove and having the ends thereof on opposite sides of the portion within the groove extending in substantial parallel relation to the shank of the hook, a sleeve of resilient plastic material of tapered formation having an inwardly extending flange at one end defining an opening of a dimension corresponding to the cross-sectional dimension of the bottom of the groove so as to fit snugly therein, said sleeve having the characteristic whereby a portion thereof extending from the flange is adapted to be positioned over the fold of the hackle and a substantial part of the length thereof when the sleeve is in operative position over the fold of the hackle and adapted to be flexed and moved to a position over the portion of the body on the side opposite to the bulbous portion while the hackle is in position to permit release of the hackle from the groove and said hackle having a binding member to firmly hold the fold of the hackle within the groove.

CHARLES ORVIL SHINDLER.

REFERENCES CITED

The following references are of record in the file of this patent:

UNITED STATES PATENTS

| Number | Name | Date |
|---|---|---|
| 1,612,264 | Cressey | Dec. 28, 1926 |
| 1,654,830 | Pflueger | Jan. 3, 1928 |
| 1,865,359 | Eger | June 28, 1932 |
| 1,884,053 | McGarraugh | Oct. 25, 1932 |
| 2,152,971 | Parkins | Apr. 4, 1939 |
| 2,166,585 | Evans | July 18, 1939 |
| 2,223,475 | Withey | Dec. 3, 1940 |
| 2,268,541 | Arbogast | Jan. 6, 1942 |
| 2,476,733 | Jacobs | July 19, 1949 |